No. 863,672. PATENTED AUG. 20, 1907.
W. E. THOMPSON.
FRUIT GATHERER.
APPLICATION FILED APR. 22, 1907.

2 SHEETS—SHEET 1.

Witnesses
L. B. James
C. H. Griesbauer

Inventor
WM. E. THOMPSON
by H. B. Willson &co
Attorneys

No. 863,672. PATENTED AUG. 20, 1907.
W. E. THOMPSON.
FRUIT GATHERER.
APPLICATION FILED APR. 22, 1907.
2 SHEETS—SHEET 2.
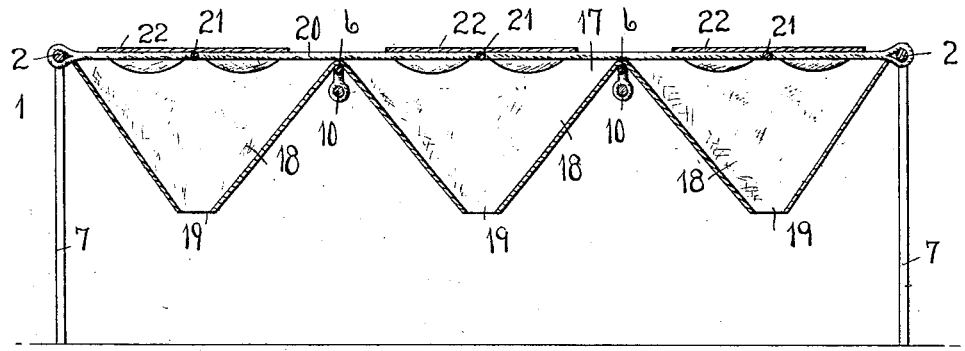
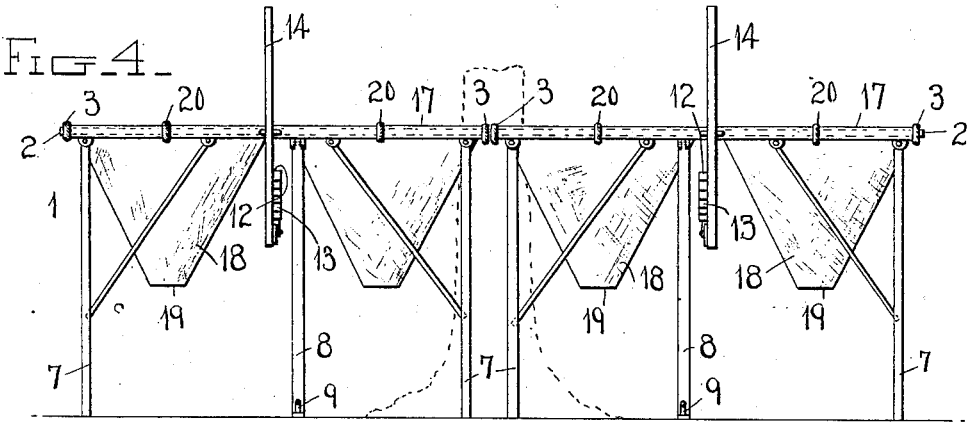
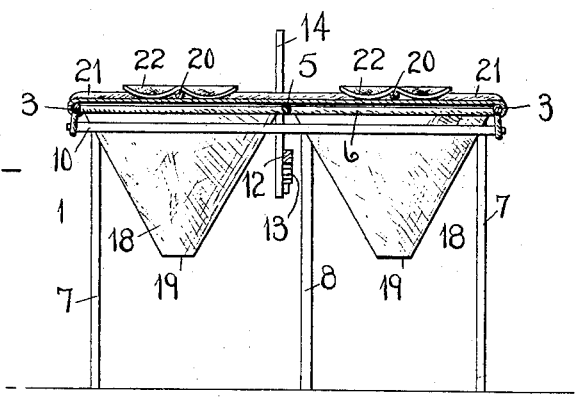
Witnesses
L. B. James
C. H. Griesbauer
Inventor
Wm. E. Thompson
by H. B. Willson & Co.
Attorneys

UNITED STATES PATENT OFFICE.

WILLIAM E. THOMPSON, OF TECUMSEH, NEBRASKA.

FRUIT-GATHERER.

No. 863,672.  Specification of Letters Patent.  Patented Aug. 20, 1907.

Application filed April 22, 1907. Serial No. 369,667.

*To all whom it may concern:*

Be it known that I, WILLIAM E. THOMPSON, a citizen of the United States, residing at Tecumseh, in the county of Johnson and State of Nebraska, have invented certain new and useful Improvements in Fruit-Gatherers; and I do declare the following to be a full, clear, and exact description of the invention, such as will enable others skilled in the art to which it appertains to make and use the same.

This invention relates to improvements in fruit gatherers.

The object of the invention is to provide a fruit gatherer adapted to be arranged beneath a tree in position to catch the fruit dislodged therefrom and to conduct the same to a suitable receptacle without bruising or marring the fruit.

A further object is to provide a device of this kind so constructed that when not in use the same may be folded in a compact form.

With these objects in view, the invention consists in certain novel features of construction, combination and arrangements of parts as will be more fully described and particularly pointed out in the appended claims.

Figure 1:
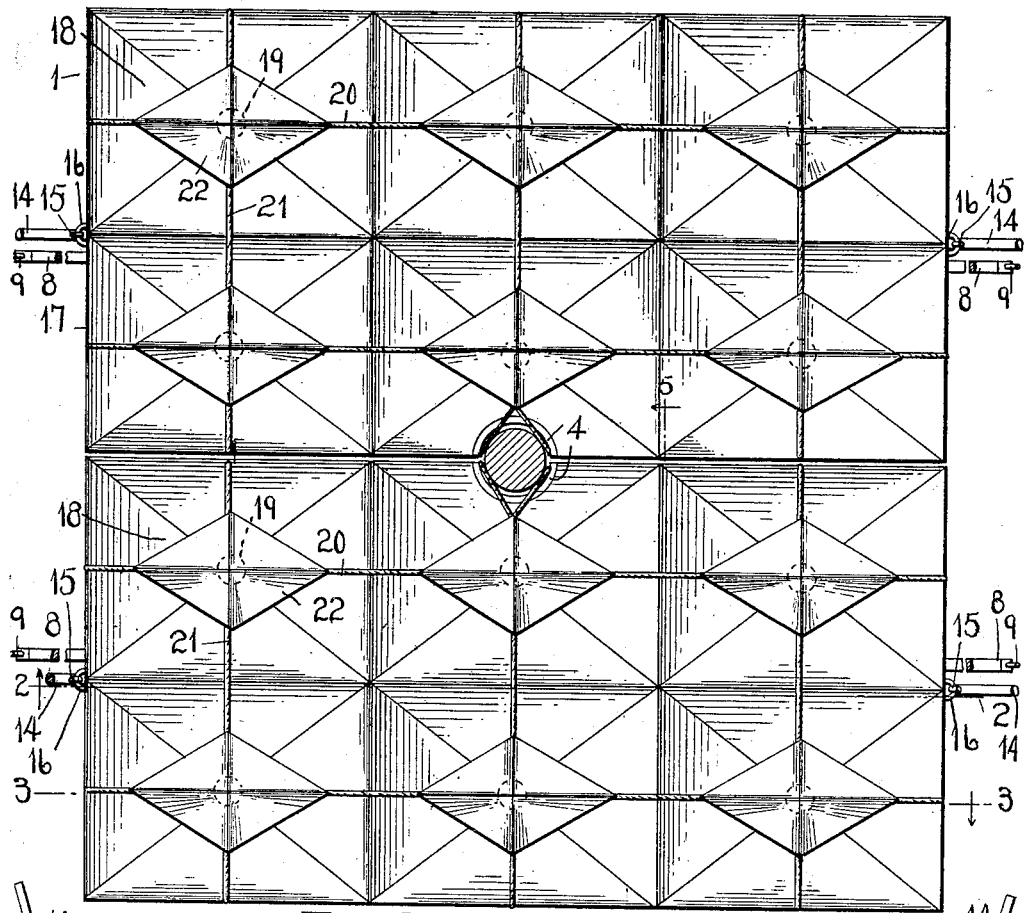
Figure 2:
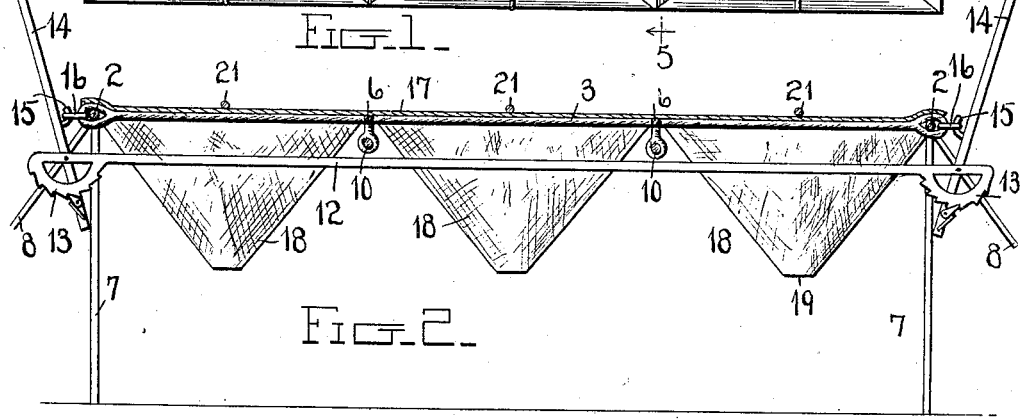

In the accompanying drawings, Figure 1 is a plan view of a fruit gatherer constructed in accordance with the invention; Fig. 2 is a vertical, longitudinal, sectional view on the line 2—2 of Fig. 1; Fig. 3 is a similar view on the line 3—3 of Fig. 1; Fig. 4 is an end elevation; and Fig. 5 is a vertical, cross sectional view on the line 5—5 of Fig. 1.

Referring more particularly to the drawings, 1 denotes a fruit gatherer, which consists of two counterpart sections adapted to be brought together around a tree in position to catch the fruit shaken or otherwise dislodged therefrom.

The sections of the gatherer are both constructed in the same manner so that a description of one will suffice for both. At the opposite end of each section are end cross bars, 2, which are connected at their opposite ends by longitudinally disposed ropes or other flexible connections, 3, in one of which, midway between its ends, is arranged a semicircular bar, 4, which is adapted to be engaged with the trunk of a tree when the sections of the gatherer are brought together in an operative position. The bars, 2, are also connected together by an intermediate rope or flexible connection, 5. The said ropes or connections, 3, are connected together at suitable intervals by cross ropes, 6, said cross ropes and the longitudinally disposed ropes forming a series of rectangular spaces.

Hingedly connected to the end cross bars, 2, adjacent to their opposite ends are supporting legs, 7, which may be of any suitable length, and are adapted to fold inwardly upon the cross bars when the device is not in use. Connected to the cross bars, 2, midway between their ends is an inclined brace rod, 8, said rods having a pivotal connection at their upper ends with the cross bars, 2, and are provided at their outer ends with pegs or spikes, 9, which are adapted to be driven into the ground to hold the frame in an operative position.

Adapted to be engaged with the longitudinal ropes, 3, adjacent to the cross ropes, 6, are spreader rods, 10, which serve to hold the side ropes, 3, in an operative position. Connected to the end cross bars, 2, midway between their ends and below the intermediate ropes, 5, is a longitudinally disposed stretching bar, 12, on the opposite ends of which are arranged segmental racks, 13, and pivotally connected to said ends of the bar, 12, are stretching levers, 14, the lower ends of which are adapted to be engaged with the teeth of the segmental racks, 13, while the upper ends of said levers project above the cross bars, 2, and are provided with hooks, 15, adapted to be engaged with loops, or rings, 16, arranged on the cross bars, 2, as shown. By providing the stretching levers, 14, the longitudinal ropes of the frame may be stretched and prevented from sagging.

Arranged on the frame-work formed by the longitudinally disposed ropes, 3 and 5, and the cross ropes, 6, is a covering, 17, which is preferably in the form of ducking or other heavy fabric. The covering 17 is forced downwardly or sagged into the spaces formed by the longitudinally disposed ropes, 3 and 5, and the cross ropes, 6, to form a series of pockets, 18, in the center or lowest portion of each of which is formed a discharge opening, 19, through which the fruit caught by the pockets, 18, is adapted to pass into suitable receptacles arranged beneath the gatherer.

Arranged over each of the pockets, 18, is a central longitudinally disposed rope or cord, 20, and a cross rope or cord, 21, the opposite ends of said cords or ropes 20 and 21, being passed through the covering, 17, and connected to the longitudinal ropes, 3 and 5, and the cross ropes, 6, and bars, 2, of the main supporting frame. Arranged on the ropes 20 and 21, over the center of each of the pockets, 18, is a rectangularly shaped piece of fabric, 22, the corners of which are secured to said ropes, 20 and 21, while the edges of the material between the ropes are permitted to sag downwardly so that the fruit striking on said fabric, 22, will roll off the same and into the pockets. The pieces of fabric, 22, form aprons to cover the central portion of the pockets and serve to break the fall of the fruit dropping over said central portion, which prevents the marring or bruising of the fruit which would be occasioned should the same fall directly onto the fruit accumulated in the center of the pockets before passing through the discharge openings therein. The aprons, 22, also serve to prevent the choking up of the discharge openings in the pockets by a too rapid accumulation of the fruit therein.

In assembling the gatherer for use, the sections of the same are brought together on each side of the tree with the semicircular bars, 4, engaging the trunk of the tree, thus permitting the side ropes, 3, to be brought into close engagement with each other.

It will be noted that in arranging the gatherer in an operative position, that the same is supported and braced by the legs, 7, and the brace rods, 8, so that additional props are not required to hold the device in an operative position, and that when it is desired to take down the device, the legs, 7, and brace rods, 8, are readily folded so that the sections of the gatherer may be rolled or folded into a neat, compact, form for storage purposes.

While the sections of the gatherer are here shown and described as being provided with six pockets each, it will be obvious that the same may be constructed to provide a greater or less number of pockets, as may be desired.

From the foregoing description, taken in connection with the accompanying drawings, the construction and operation of the invention may be readily understood without requiring a more extended explanation.

Various changes in the form, proportions and the minor details of construction may be resorted to without departing from the principle, or sacrificing any of the advantages of this invention, as defined in the appended claims.

Having thus fully described my invention, what I claim as new, and desire to secure by Letters-Patent, is:

1. A fruit gatherer, comprising a flexible supporting frame, means to support the same in position, a series of flexible pockets arranged in said frame, means to break the fall of the fruit dropped into said pockets, and means to stretch said frame, substantially as described.

2. A fruit gatherer formed in counterpart sections adapted to be brought together around a tree, each of said sections comprising a flexible frame having end cross bars, supporting legs hingedly connected to the end cross bars of said frame, a brace bar to hold said frame and legs in an operative position, means to stretch said flexible frame, a series of flexible pockets arranged on said frame, and means to break the fall of the fruit dropping into said pockets, substantially as described.

3. A fruit gatherer formed in sections adapted to be brought together around a tree, each of such sections comprising a flexible frame consisting of end cross bars, a series of longitudinally disposed ropes connecting said bars, a series of cross ropes connecting said longitudinal ropes to form between the same a series of spaces, means to support said frame, a fabric covering arranged over the latter to form pockets in each of said spaces, and means to break the fall of the fruit dropping into said pockets, substantially as described.

4. A fruit gatherer formed in sections adapted to be brought together around a tree, each of such sections comprising a flexible frame consisting of end cross bars, a series of longitudinally disposed ropes connecting said bars, a series of cross ropes connecting said longitudinal ropes to form between the same a series of spaces, supporting legs hingedly connected to said cross bars, inclined brace rods having a pivotal connection at their upper ends with said cross bars, fastening spikes arranged in the lower ends of said brace rods, means to stretch said frame, a fabric covering arranged over the latter to form a series of pockets in the spaces of said frame, and fruit receiving and deflecting aprons arranged over said pockets, substantially as described.

5. A fruit gatherer formed of counterpart sections adapted to be brought together to an operative position around a tree, each of said sections comprising end cross bars, a series of longitudinally disposed flexible connections arranged between said bars, transversely disposed flexible connections arranged across said longitudinal connections and secured thereto to form a series of spaces, a semicircular trunk engaging bar arranged in one of the longitudinal side connections of each of said sections, transversely disposed stretching bars arranged between the outer longitudinal connections of the frames, supporting legs hingedly connected to said end bars, inclined brace rods having a pivotal connection at their upper ends with the end bars and provided with fastening spikes at their lower ends, a longitudinally disposed stretching bar arranged beneath the center of said frame, a stretching lever pivotally mounted on each end of said stretching bar and connected to said frame, a rack bar to hold said stretching levers in an operative position, a fabric covering arranged over said flexible frame to form a series of pockets having discharge apertures in their lower ends, substantially as described.

6. A fruit gatherer formed in counterpart sections adapted to be engaged to the opposite sides of a tree, each of said sections comprising a flexible supporting frame consisting of end cross bars, a series of longitudinally disposed flexible connections between said bars, transverse flexible connections arranged across said longitudinal connections, supporting legs hingedly connected to said end cross bars, inclined brace rods to hold said frame in an operative position, means whereby the frame is stretched, a flexible covering arranged over said frame to form a series of pockets each pocket having a discharge aperture formed in the bottom thereof, longitudinally and transversely disposed cords or ropes arranged over each of said pockets and connected to said frame, and fabric deflecting aprons arranged on said cords to receive and break the fall of the fruit into said pockets, substantially as described.

In testimony whereof I have hereunto set my hand in presence of two subscribing witnesses.

WILLIAM E. THOMPSON.

Witnesses:
C. J. CANON,
JOHN R. PIERSON.